United States Patent [19]

Saur

[11] Patent Number: 5,711,258
[45] Date of Patent: Jan. 27, 1998

[54] COOLING SYSTEM FOR AN INTERNAL-COMBUSTION ENGINE

[75] Inventor: Roland Saur, Stuttgart, Germany

[73] Assignee: Behr Thermot-tronik GmbH & Co., Kornwestheim, Germany

[21] Appl. No.: 799,805

[22] Filed: Feb. 13, 1997

[30] Foreign Application Priority Data

Feb. 21, 1996 [DE] Germany ............... 196 06 202.0

[51] Int. Cl.⁶ ................................................. F01P 3/00
[52] U.S. Cl. ........................ 123/41.29; 123/41.33; 236/101 C; 236/34.5; 237/12.3 B
[58] Field of Search ...................... 123/41.1, 41.29, 123/41.31, 41.33; 236/101 C, 34 S; 237/12.3 B

[56] References Cited

U.S. PATENT DOCUMENTS

| | | |
|---|---|---|
| 4,055,298 | 10/1977 | Wilson . |
| 4,190,198 | 2/1980 | Casuga et al. ............... 236/34.5 |
| 4,410,133 | 10/1983 | Furukubo . |
| 5,188,287 | 2/1993 | Chamot ............... 236/34.5 |
| 5,271,559 | 12/1993 | Naujock ............... 237/12.3 B |
| 5,381,951 | 1/1995 | Michel ............... 236/34.5 |
| 5,385,296 | 1/1995 | Kurz et al. . |

FOREIGN PATENT DOCUMENTS

| | | |
|---|---|---|
| 0 467 130 | 1/1992 | European Pat. Off. . |
| 36 13 496 | 10/1987 | Germany . |
| 40 33 261 | 4/1992 | Germany . |
| 42 30 571 | 3/1994 | Germany . |
| 2155153 | 2/1985 | United Kingdom . |
| 2286675 | 2/1985 | United Kingdom . |

Primary Examiner—Erick R. Solis
Attorney, Agent, or Firm—Evenson, McKeown, Edwards & Lenahan, P.L.L.C.

[57] ABSTRACT

A cooling system for an internal-combustion engine which is cooled by means of a liquid coolant and is arranged in a circulating system having a coolant radiator, to which circulating system at least one heat exchanger of an accessory device is connected by means of a switching valve. As a switching element for switching the valve element, a thermostatic working element is used which is loaded by means of a restoring spring, is acted upon by the coolant and is provided with an electric heater. The thermostatic working element contains an expansion material which is designed to a switching temperature which is higher than a maximal operating temperature of the coolant flowing to the thermostatic working element.

20 Claims, 4 Drawing Sheets

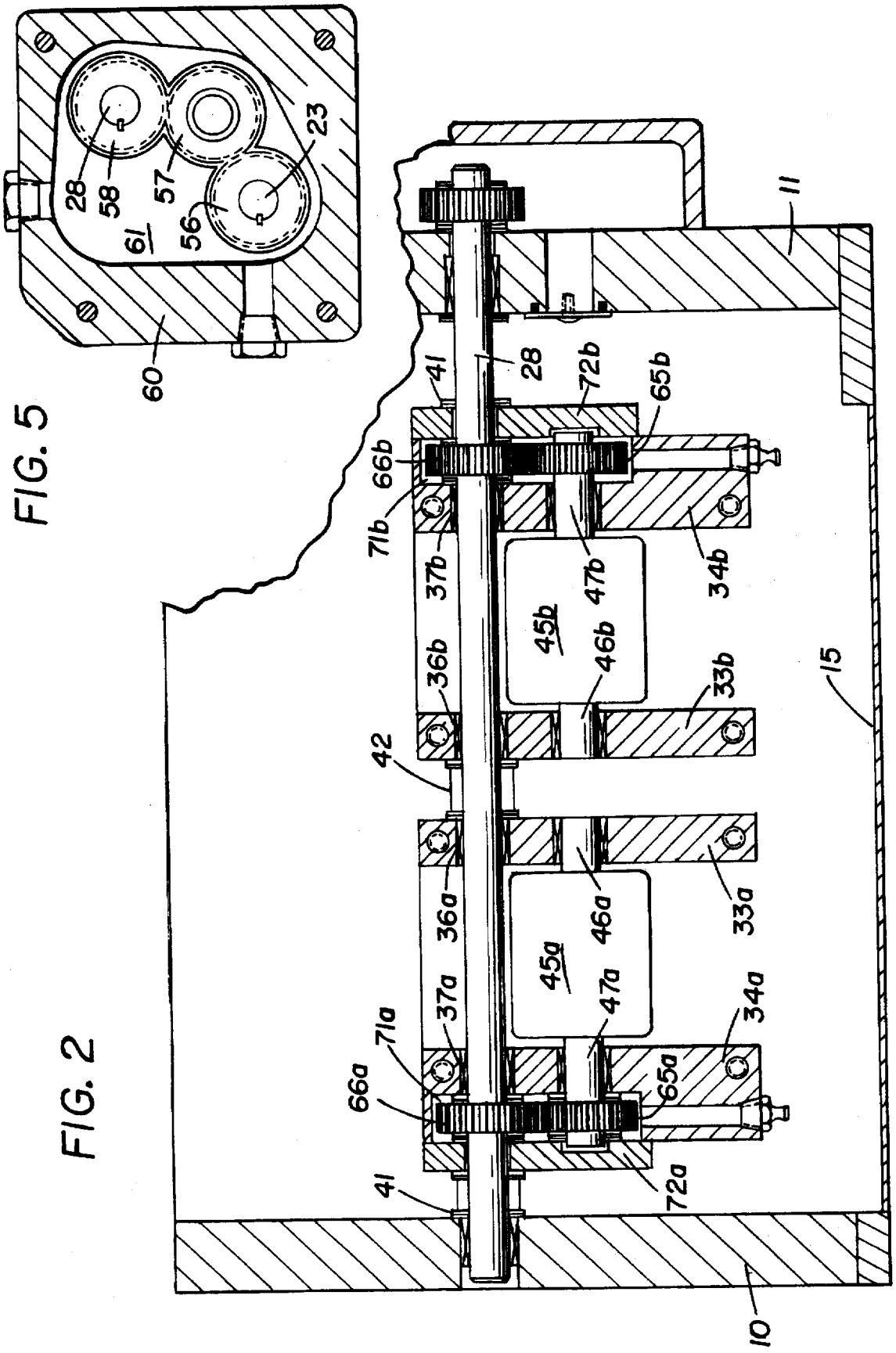

COOLING SYSTEM FOR AN INTERNAL-COMBUSTION ENGINE

BACKGROUND AND SUMMARY OF THE INVENTION

This invention relates to a cooling system for an internal-combustion engine which is cooled by means of a liquid coolant and which is arranged in a circulating system having a coolant radiator, to which circulating system at least one heat exchanger of an accessory device is connected by means of a switching valve which contains a valve element which can be switched into two positions and which, in one position, blocks a connection between the coolant circulating system and the heat exchanger of the accessory device and opens it up in the other position.

Cooling systems of this type are used predominantly in motor vehicles. In order to reduce the pollutant emissions and the fuel consumption, it is endeavored to, on the one hand, shorten the warm-up phase after a cold start and, on the other hand, increase the engine temperature and thus the coolant temperature to the extent permitted by the operating condition of the internal-combustion engine without the danger of an overheating. The latter is permitted, for example, by means of a so-called characteristic-diagram thermostat, as known from U.S. Pat. No. 5,385,296.

Normally, heat exchangers of accessory devices, particularly heat exchangers of a heater, an oil cooler or charge air cooler or the like, are connected to the cooling circulating system. However, the endeavored raising of the operating temperature of the internal-combustion engine in certain operating conditions and thus the increase of the temperature of the coolant may lead to problems in the case of these accessory devices. There is the danger that the heat exchangers of the accessory devices may be thermally overloaded. Furthermore, there is the problem for example, in the case of the interior heater of the vehicle that, at a very high temperature of the coolant flowing through the heat exchanger or exchangers of the interior heater, the air entering into the occupant interior is heated to excessive temperature values which feel unpleasant to the vehicle occupants.

A cooling system for an internal-combustion engine is also known (German Patent Document DE-A 40 33 261) in the case of which a switching valve is arranged in front of the heat exchanger of the heater for the vehicle interior which, in one switching position, opens up the inflow to the heat exchanger of the interior heater and blocks it in the other position.

It is an object of the invention to permit, in the case of a cooling system of the initially mentioned type, a requirement-oriented coolant temperature control for the accessory devices.

This and other objects have been achieved according to the present invention by providing a cooling system for an internal-combustion engine which is cooled by a liquid coolant and which is arranged in a circulating system having a coolant radiator, to which circulating system at least one heat exchanger of an accessory device is connected by way of a switching valve which contains a valve element which can be switched into two positions and which, in one of said positions, blocks a connection between the coolant circulating system and the heat exchanger of the accessory device and, in the other of said position, opens up said connection, wherein a thermostatic working element is provided for switching the valve element, said thermostatic working element being biased by a restoring spring, being acted upon by the coolant and being provided with an electric heater, and wherein the thermostatic working element contains an expansion material which is designed for a switching temperature which is higher than a maximal operating temperature of the coolant flowing to the thermostatic working element.

As the switching element for the switching of the valve element, a thermostatic working element is provided which is loaded by a restoring spring, which acts upon the coolant and which is provided with an electric heating device. The thermostatic working element contains an expansion material which is designed for a switching temperature which is higher than a maximal operating temperature of the coolant flowing to the thermostatic working element.

Switching valves having a thermostatic working element used as a switching valve can be produced at reasonable cost, so that it can be easily implemented economically to assign a separate switching valve to each accessory device. For the switch-over, this switching valve requires only a current supply in one direction, that is, a switching-on and switching-off of the electric heating device. The resetting takes place automatically by means of the restoring spring and the coolant because the expansion material of the thermostatic working element is designed such that, at any operating temperature, the coolant causes a cooling of the expansion material below its switching temperature so that, as a result, the thermostatic working element switches back automatically.

In a further development of the invention, it is provided that, in one position, the switching valve opens up a connection to the heat exchanger of the accessory device and blocks a connection to a bypass bypassing the heat exchanger of the accessory device and, in the other position, blocks the connection to the heat exchanger and opens up the bypass. As a result, it is achieved that, independently of the position of the switching valve, the flow resistances through the accessory devices remain essentially the same so that therefore the pressure level in the cooling system is also not significantly changed.

In a further development of the invention, it is provided that the thermostatic working element is surrounded by a shield which is opened when the heater is switched on and closed when the heater is switched off. In this manner, it is achieved that the energy requirement for the switching of the switching valve is limited by means of the electric heater because the heat introduced by the electric heater is not immediately transported away by the coolant. As a result, it is possible to also switch the switching valve by means of the electric heater when the coolant temperature is relatively low. The switching valve can be used such that it is open in a currentless state; that is, it opens up the connection to the heat exchanger of the accessory device when the electric heater is not energized, or it is closed in a currentless state; that is, it blocks the connection to the heat exchanger of the accessory device when the electric heater is not energized. If the switching valve is used such that it is open in a currentless state, it should expediently also be provided that a thermal overloading of the heat exchanger of the accessory device is excluded when the coolant temperature is too high. This can take place by designing the switching temperature of the expansion material of the thermostatic working element. In another embodiment, it will then be provided that, between the switching valve and the heat exchanger of the accessory device, preferably together with the switching valve in a common valve housing, a thermostatic shut-off valve is arranged which is designed for a predetermined closing temperature. This closing temperature is determined such that it is below a temperature at which damage to the heat exchanger of the accessory device or other elements of the accessory device is to be expected.

In a further development of the invention, it is provided that several switching valves are combined to a valve block which has a common inflow junction connected with the coolant circulating system, a common return flow junction leading back to the coolant circulating system and individual junctions leading to the heat exchangers of the accessory devices. Such a valve block advantageously permits the reaction of the number of required pipes since flow paths are integrated into the valve block.

In a particularly advantageous embodiment, it is provided that a thermostatic control valve of the coolant circulating system is housed in the valve block. This results in a very compact construction, in which case the thermostatic control valve can be a conventional thermostatic valve or an electrically heatable characteristic diagram thermostat.

Other objects, advantages and novel features of the present invention will become apparent from the following detailed description of the invention when considered in conjunction with the accompanying drawings.

DETAILED DESCRIPTION OF THE DRAWINGS

Figure 1:
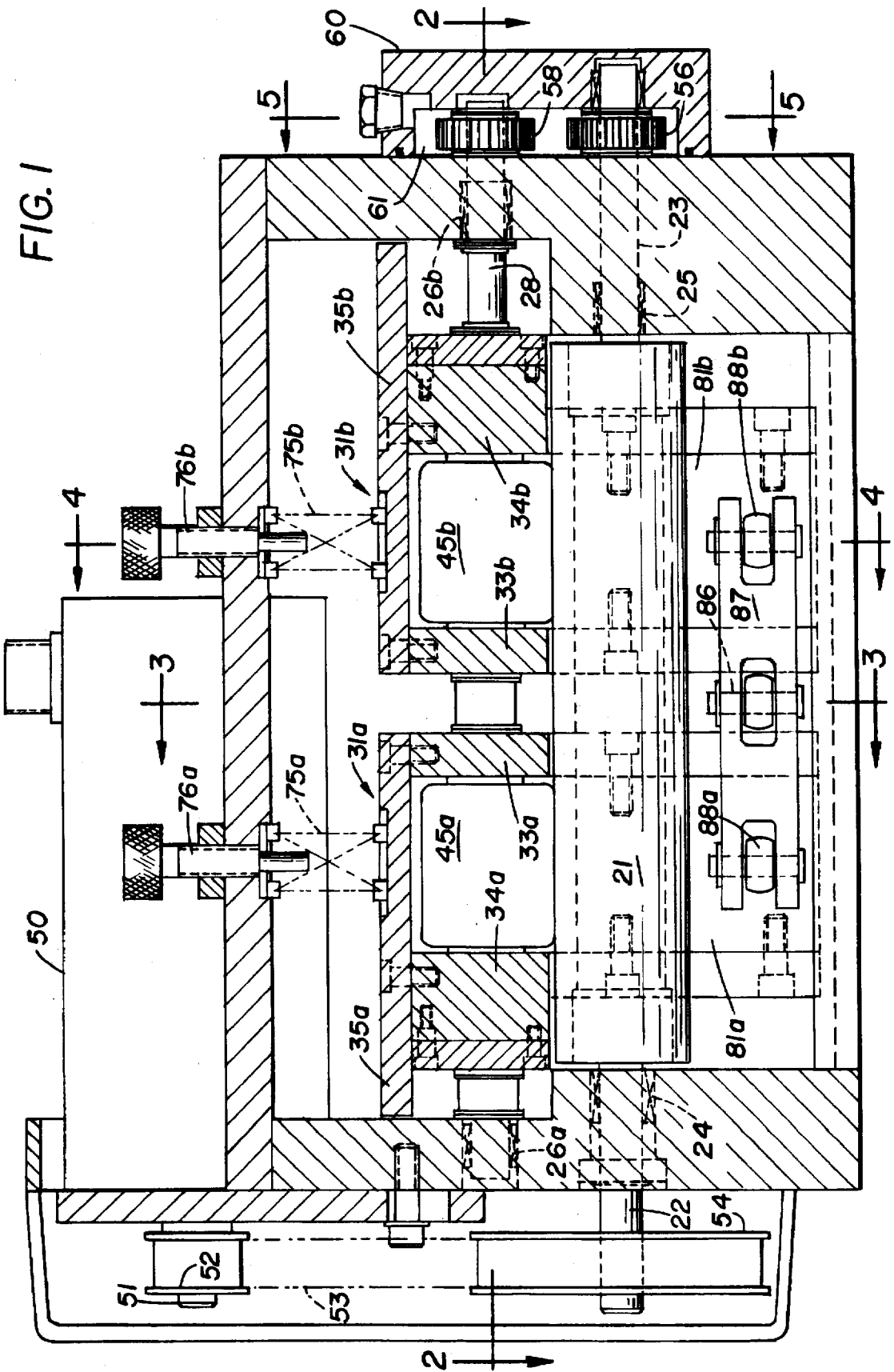
FIG. 1 is a schematic view of a cooling system which according to a preferred embodiment of the present invention is equipped with switching valves for the heat exchangers of accessory devices.

The cooling system for a liquid-cooled internal-combustion engine 10 illustrated in FIG. 1 is equipped with a so-called engine inlet control. The coolant flows from the internal-combustion engine 10 by way of an engine outlet pipe 11 to a coolant radiator 12 and from there, by way of a return flow pipe 13, to the engine inlet at which a coolant pump 14 is arranged. A bypass 15, which is connected by way of a thermostatic control valve 16 with the return flow pipe 13, adjoins the engine outlet pipe 11. Preferably, the thermostatic control valve 16 is a so-called characteristic diagram thermostat; that is, a thermostatic control valve which operates by means of an expansion material and has an electric heater for the thermostatic working element of the thermostatic valve 16 by means of those switching-on and switching-off the thermostatic valve 16 can be switched to at least two different temperature levels to which the coolant temperature and therefore the engine temperature are controlled. The thermostatic valve 16 is constructed, for example, corresponding to U.S. Pat. No. 5,385,296.

On the engine outlet, a so-called warm-up thermostat 17 is also provided which is a combination of a thermostatic valve adjusted to a given opening temperature and of a pressure control valve. The warm-up thermostat 17 keeps the connection between the engine outlet and the engine outlet pipe 11 closed (with the exception of a leakage quantity) to a given temperature so that the warm-up phase of the internal-combustion engine 10 is shortened. In the case of an excess pressure which occurs, for example, as the result of an increased rotational engine speed, however, the warm-up thermostat 17 will open up as a function of the pressure; that is, it will then act as a pressure control valve.

Pipes 18, 19 branch off from the engine outlet pipe 11 and lead to heat exchangers 20, 21 of accessory devices. The heat exchanger 20 is, for example, part of a heater for the vehicle interior, whereas the heat exchanger 21 is part of the oil cooling device. The coolant emerging from the heat exchangers 20, 21 is supplied by way of a common return flow pipe 22 to the mixing chamber of the thermostatic control valve 16. In front of the heat exchangers 20, 21, electrically switchable switching valves 23, 24 are arranged in each case whose construction will be explained in reference to FIGS. 2 to 6. The switching valves 23, 24 are in each case adjoined by bypass pipes 25, 26 which bypass the respective pertaining heat exchanger 20, 21 and lead into the return flow pipe 22.

However, the switching valves 23, 24 may also be arranged such that they are open or closed in a currentless state. Open in a currentless state means that, in their non-energized condition, the switching valves 23, 24 open up the connection to the pertaining heat exchanger 20, 21 and block the connection to the respective bypass pipes 25, 26. Closed in a currentless state means that, in their non-energized condition, the switching valves 23, 24 block the connection to the respective heat exchangers 20, 21 and open up the connection to the respective bypass pipes 25, 26. By means of the switching valves 23, 24, it is possible to control the temperature in the heat exchangers 20, 21 to a given value and/or to limit it to a maximum temperature. For this purpose, temperature sensors are assigned to the heat exchangers 20, 21 or their outlet pipes, the signals of these temperature sensors being processed in a control device which is not shown and which determines and opening and closing of the switching valves 23, 24.

Figure 3:
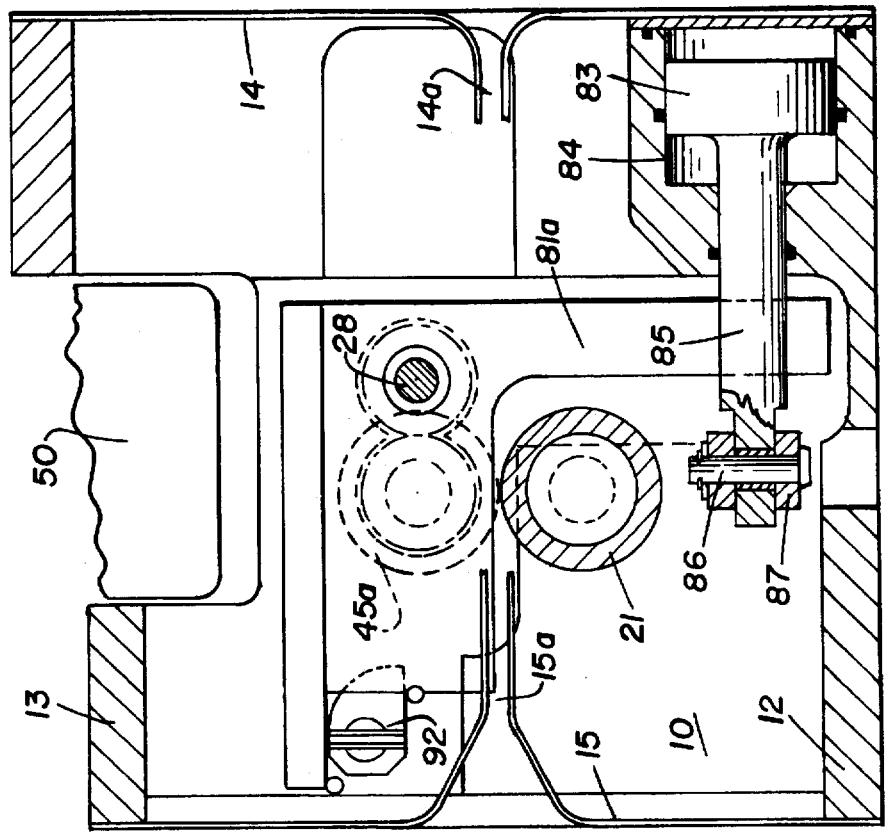
FIG. 3 is a longitudinal sectional view of the switching valve of FIG. 2 in a non-energized condition.
Figure 4:
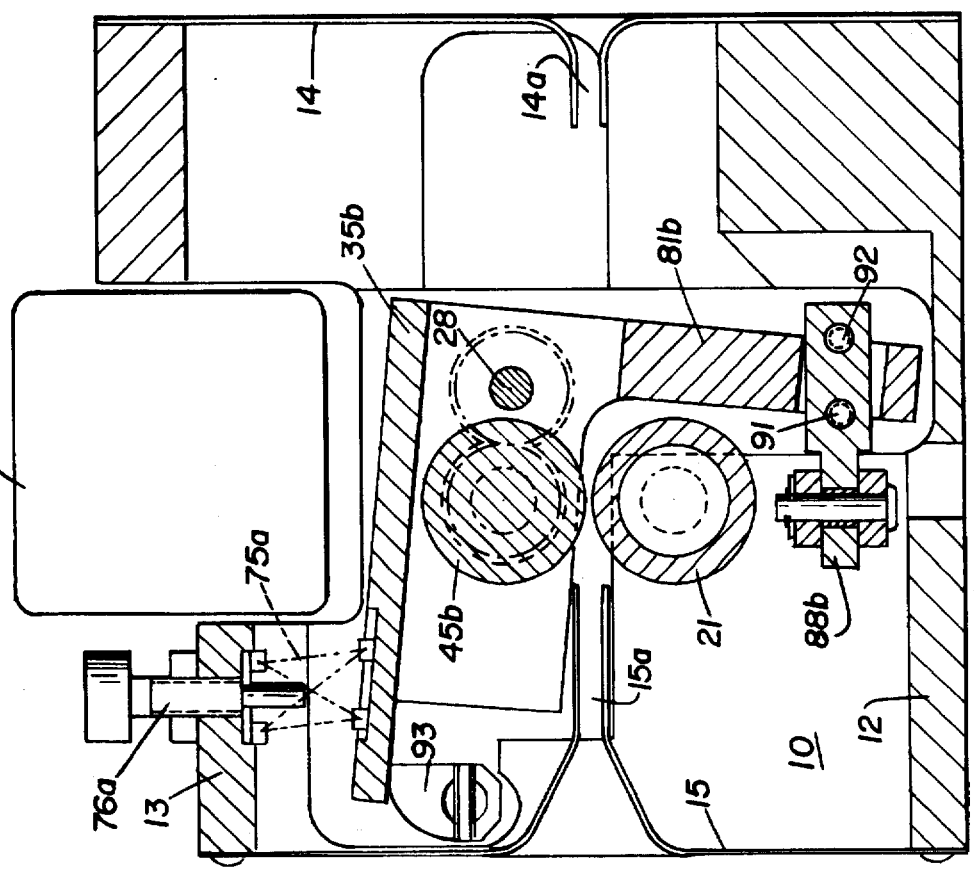
FIG. 4 is a view of a detail in the direction of the arrow IV of FIG. 3.
Figure 2:
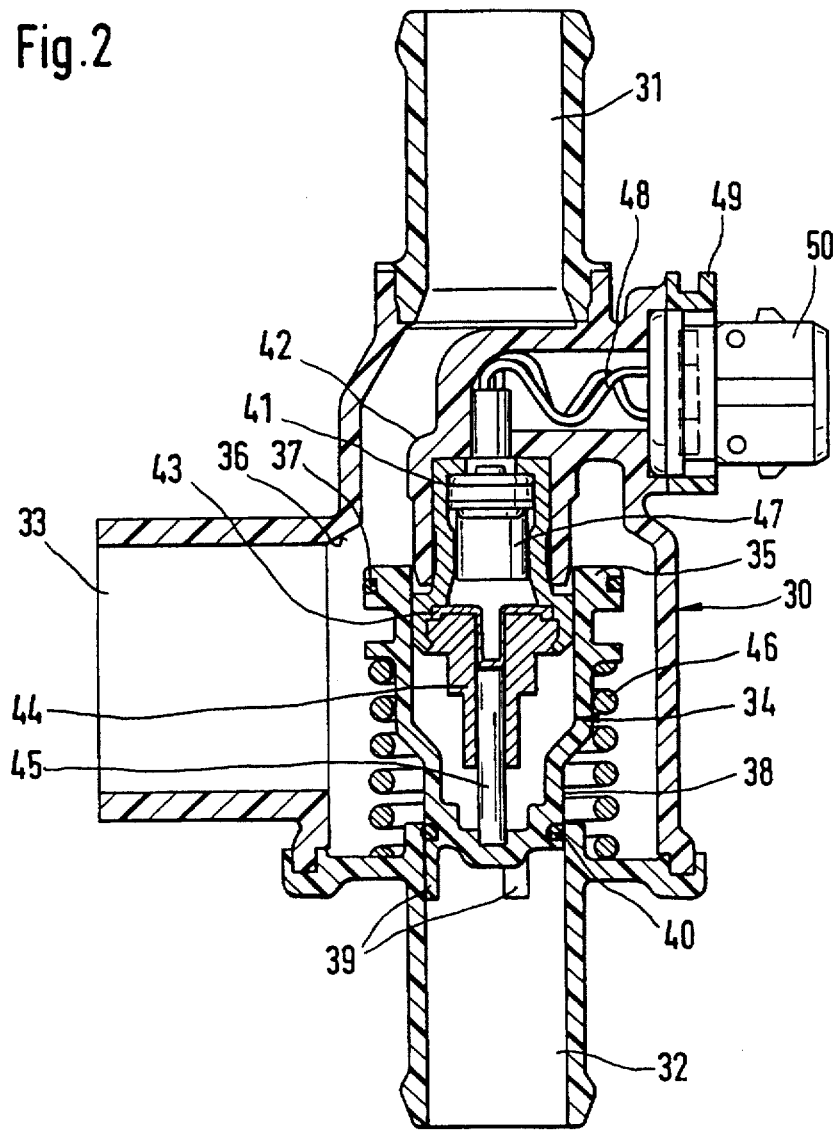
FIG. 2 is a longitudinal sectional view of a switching valve in an energized condition.
Figure 3:
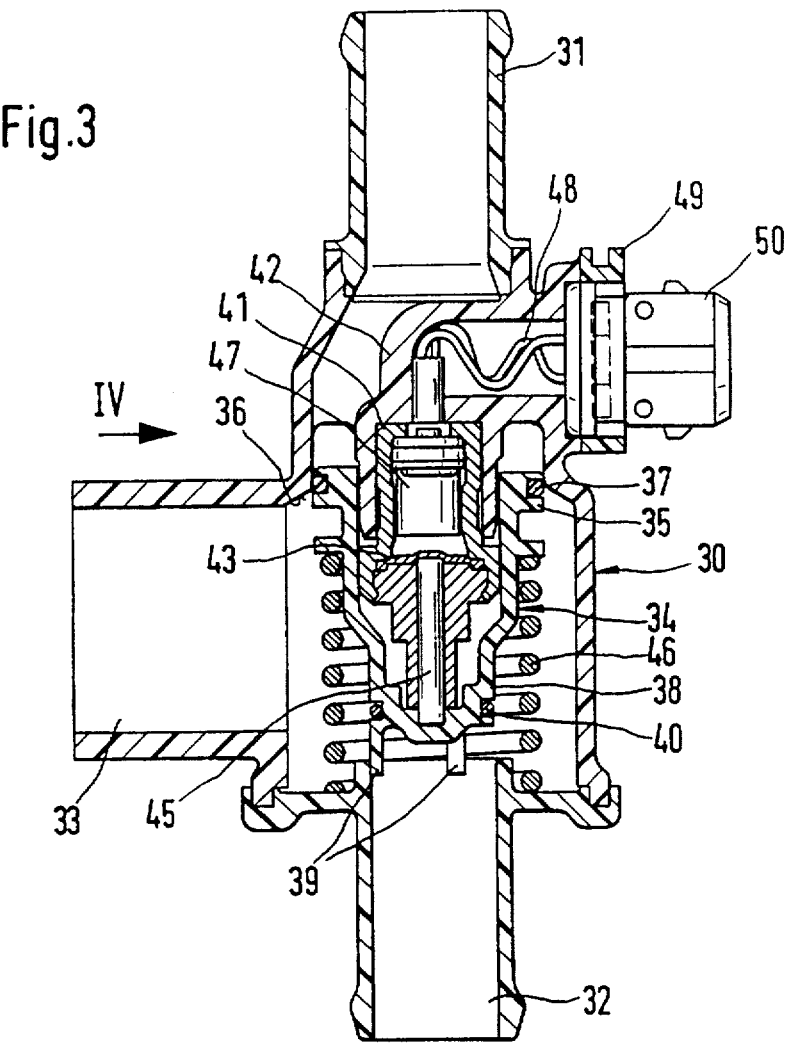
Figure 4:
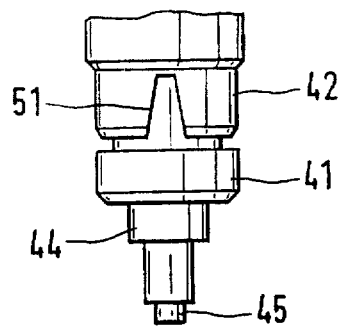

A first embodiment of the switching valves 23, 24 is illustrated in FIGS. 2 to 4. The switching valve 23, has a valve housing 30 which is made of plastic material and is provided with two opposite outlet junctions 31, 32. An inflow junction 33 is provided between these two outlet junctions 31, 32. The connection between the inflow junction 33 and the outlet junctions 31, 32 can be alternately opened up and blocked by means of a valve element 34. The valve element 34 made of a plastic material has a pot-shaped design. In the area of the open edge, a collar is provided which serves as a closing element 35 and which, in a valve-disk-type manner, is assigned to a valve seat 36 of the valve housing 30. The closing element 38 is provided with a sealing ring 37. The closing element 38 and the valve seat 36 are arranged between the inflow junction 33 and the outlet junction 31.

The closed end of the pot-shaped valve element 34 forms a valve slide 38 which is assigned to the outlet junction 32 constructed as a valve seat. The part of the valve element 34 constructed as a valve slide 38 is provided with a ring seal 40. Several webs 39 project away from the closed end of the valve element 34, by means of which webs 39 the valve element 34 is guided and centered in the outlet junction 32.

In the position according to FIG. 2, the connection between the inflow junction 33 and the outlet junction 31 is open, whereas the connection to the outlet junction 32 is closed. In contrast, in the position of the valve element 34 corresponding to FIG. 3, the connection between the inflow junction 33 and the outlet junction 32 is opened up and the connection to the outlet junction 31 is blocked. For switching the valve element 34 between the positions according to FIG. 2 and 3, a thermostatic working element is used which is arranged in the interior of the valve housing 30. The thermostatic working element has a metallic housing 41 which is stationarily held in a holder 42 of the valve housing 30. The housing 41 contains an expansion material, particularly a wax mixture. It is closed off toward the outside by means of a membrane 43 which is secured in the housing 41 by means of a guide part 44 in which a working piston 45 is guided. In the interior, the working piston 45 is supported on the closed end of the valve element 34 which is loaded against the moving-out direction of the working piston 45 by means of a restoring spring 46. In the interior of the housing 41 of the thermostatic working element, an electric resistance heating element 47 is arranged whose current supply lines 48 are guided through a stopper into the interior of the housing 41 and through the holder 42 to the outside to a plug element 50 which is sealingly inserted in a frame 49.

By energizing the resistance heating element 47, the expansion material is heated at least to its switching temperature; that is, to the temperature at which the wax mixture changes its state of aggregation and thus significantly enlarges its volume. As a result, the working piston 45 is moved out of the housing 42 so that the valve element 34 is taken along and is changed into the other switching position (FIG. 2). After the resistance heating element is switched off, the housing 41 of the thermostatic working element is cooled by the coolant so that the expansion material again reduces its volume and the valve element 34, together with the working piston 45, because of the effect of the restoring spring 46, is pressed back into the starting position in which the connection between the inflow junction 32 and the outlet junction 31 is closed again (FIG. 3). In order to cause this switching back, it is provided that the switching temperature of the expansion material of the thermostatic working element is designed such that it is situated at a sufficient distance above the maximal temperature at which the coolant flows in during the normal operation of the switching valve 23, 24. Thus, it is ensured that, with respect to the thermostatic working element, the coolant achieves a sufficient cooling effect in order to cause the return movement of the valve element 34.

The thermostatic working element is surrounded by a shield which is closed in the non-energized condition (FIG. 3) and is opened in the energized condition (FIG. 2). As a result, in the currentless condition, the cooling effect of the coolant is limited to the thermostatic working element so that, when an energizing takes place, the resistance heating element 47 must essentially heat only the expansion material inside the housing 41 and as little as possible of the coolant which is in contact with it. This ensures a fast response. In addition, it is possible to switch the switching valve 23, 24 by energizing the resistance heating element 47 also when the coolant is still cold.

In the embodiment, the shield for the housing 41 of the thermostatic working element is formed by the pot-shaped valve element 34 and the holder 42 which frames the housing 41. The pot-shaped valve element 34 reaches around the holder 42 in the area of the housing 41. The gaps between the valve element 34 and the holder 42 as well as to the housing 41 are so large that, during a transition from the position according to FIG. 2 into the position according to FIG. 3, the coolant can flow out of the interior of the valve element.

As illustrated in FIG. 4, in its area surrounding the housing 41, the holder 42 is provided with axial cutouts 51. By means of the shaping of the cutouts 51, it is possible to determine the effect of the flow of the coolant around the housing 41 of the thermostatic working element.

As mentioned above, it is possible to use the switching valve according to FIGS. 2 to 4 such that it is open or closed in a currentless state. When it is arranged to be open in a currentless state, the outlet junction 32 is connected to the heat exchanger 20 or 21 and the outlet junction 31 is connected to the bypass 25 or 26. When it is to be arranged to be closed in a currentless state, inversely the outlet junction 31 is connected to the consuming device and the outlet junction 32 is connected to the bypass.

When the switching valve 23, 24 is arranged in a currentless open state in the arrangement, there is the danger that, if the control device and/or the electric resistance heating element 47 fails and the operating temperature of the coolant is exceeded, coolant is supplied to the heat exchanger 20, 21 of the accessory device at a temperature which exceeds a temperature which is permissible for this heat exchanger 20, 21. In order to avoid this, the expansion material situated in the housing 41 of the thermostatic working element can be designed to a switching temperature which is adapted to a temperature still permissible for the heat exchanger 20, 21. If this temperature is exceeded, the thermostatic working element provides that also without any energizing and without the electric resistance heating element 47, the valve element 34 is changed into the position according to FIG. 3; that is, it blocks the outlet junction 32.

Figure 5:
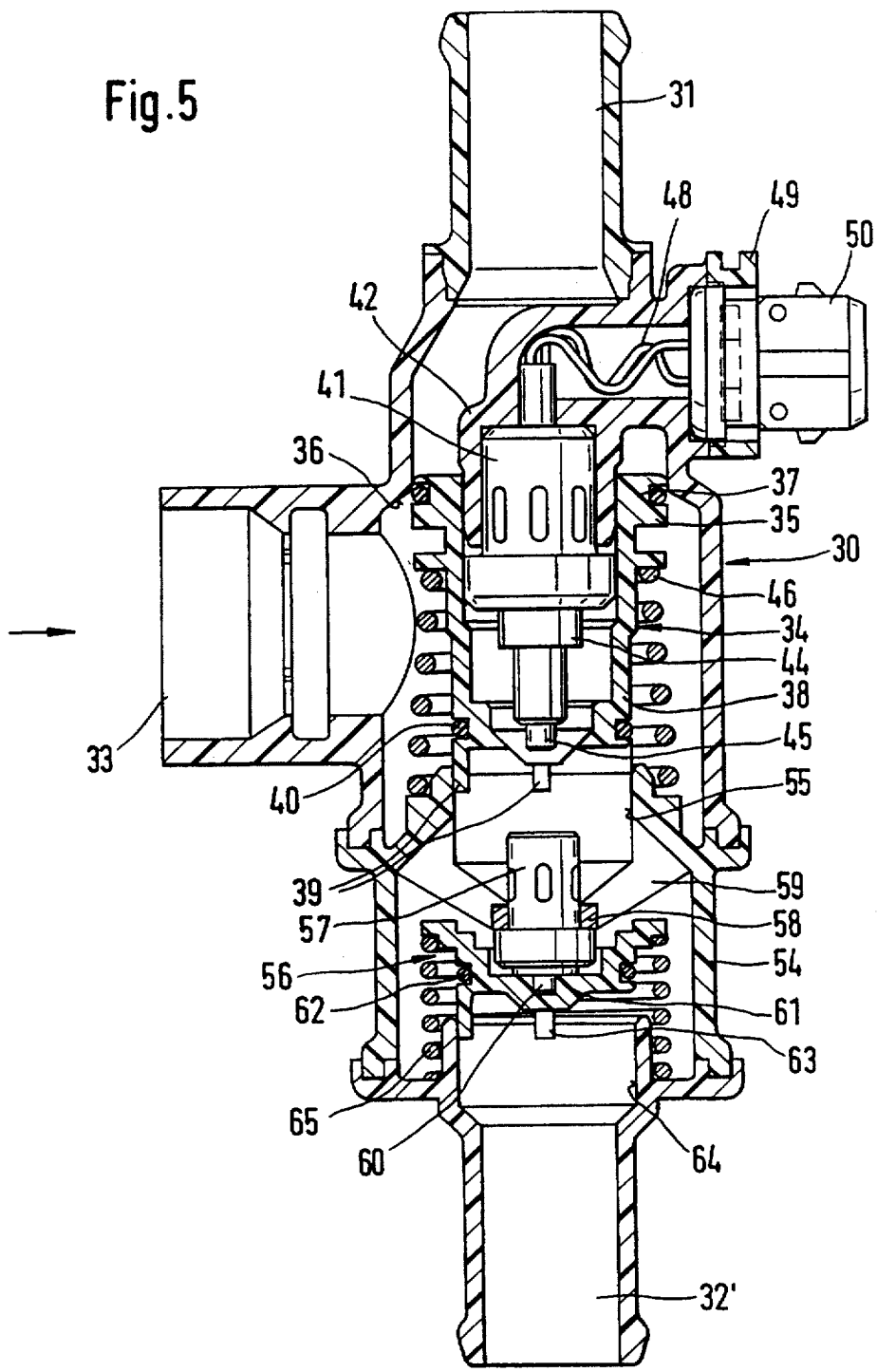
FIG. 5 is a longitudinal sectional view of another embodiment of a switching valve.
Figure 6:
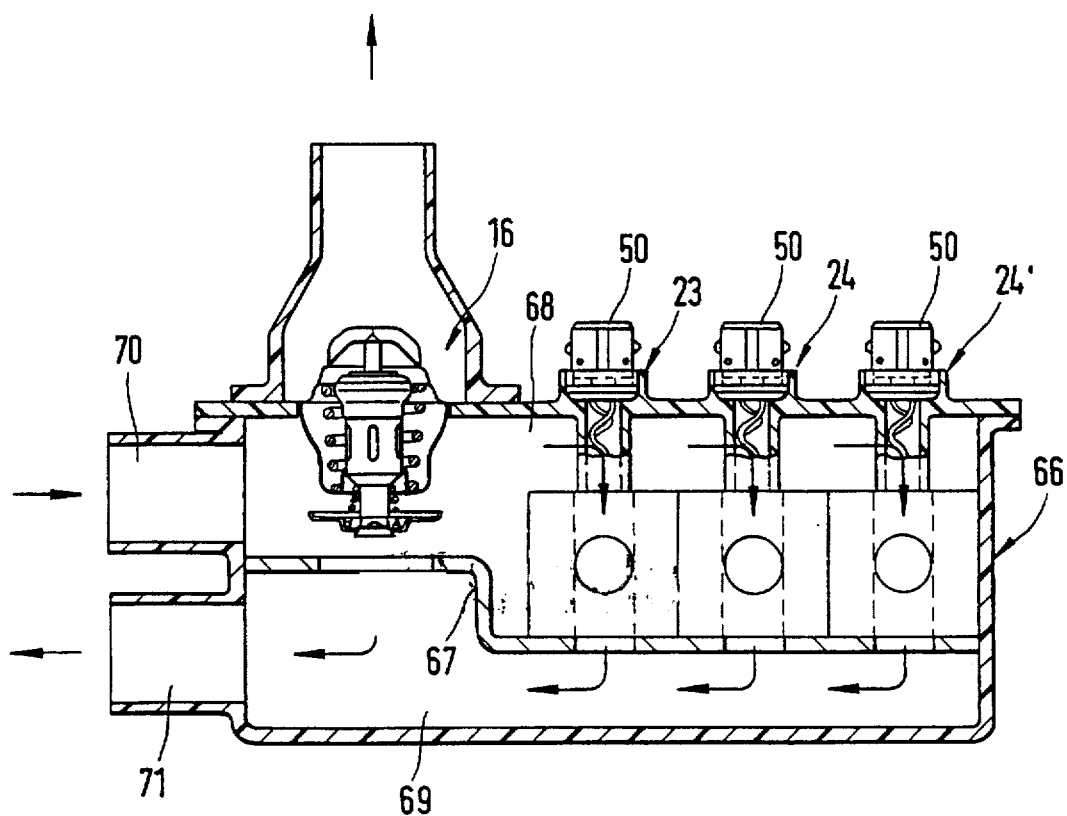

In its construction, the embodiment according to FIG. 5 corresponds largely to the embodiment according to FIG. 2 to 4 so that the same reference numbers are used for the same constructional elements and reference is made to the description concerning FIGS. 2 to 4. The switching valve according to FIG. 5 is used in the "currentless open" condition; that is, the outlet junction 31 is connected to the bypass pipe 25 or 26. The difference with respect to the embodiment according to FIG. 2 to 4 consists of the construction of the currentless open outlet junction. Between the actual outlet junction 32' and the valve element 34, an intermediate piece 64 is inserted into the valve housing 30. This intermediate piece 54 forms a valve seat 55 for the closed end of the valve element 34 constructed as the slide valve 38. Between this valve seat 55 and the outlet junction 32', a thermostatic shut-off valve 56 is arranged. This thermostatic shut-off valve 56 contains a thermostatic working element whose housing 57 is supported by means of a collar against a ring 58 which is held on webs 59 of the intermediate piece 54. The working piston 60 which moves out in the direction of the outlet junction 32' adjusts the slide valve element 61 which is provided with a sealing ring 62 on its circumference. A valve seat 64 of the outlet junction 32' is assigned to this slide valve element 61, in which valve seat 64 the slide valve element 61 is guided and centered by means of webs 63. A restoring spring 65 loads the slide valve element 61 in the direction of the housing 57; that is, in the moving-in direction of the working piston 60. The housing 57 contains an expansion material whose switching temperature is designed to a value at which with a sufficient certainty damage is avoided to the heat exchanger 20 or 21 which follows. As long as the coolant temperature does not reach this switching temperature, the shut-off valve 56 will remain open. Should, for some reason, the coolant temperature exceed this value and the control for the switching valve should fail at the same time and/or the electric heater of the switching valve fail, the shut-off valve 56 will close before the heat exchanger 20 or 21 can be damaged.

Also in the case of this embodiment, all components, including the valve element 34 and the valve slide element 61 are made of plastic. Only the housing 41, the guide part 44 and the working piston 45 as well as the housing 57 and the working piston 60 consist of metal.

Figure 6:
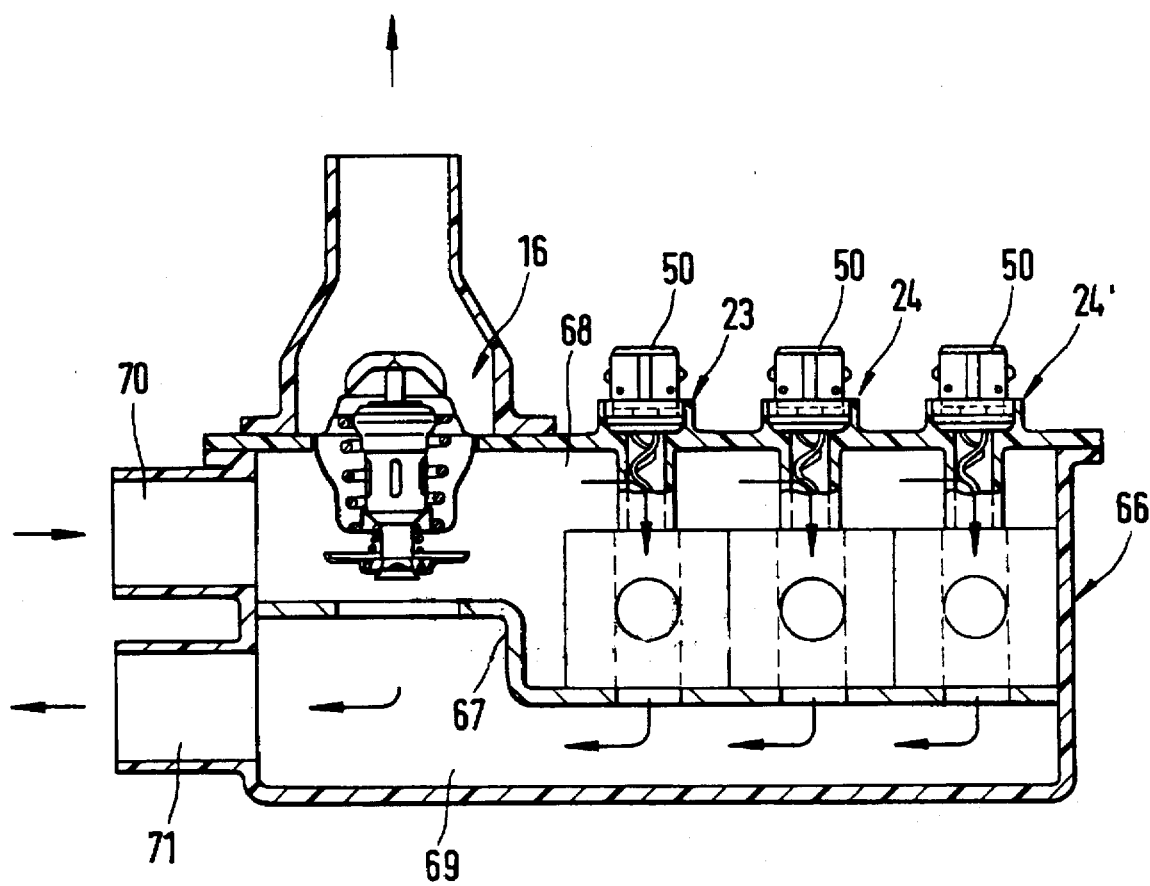
FIG. 6 is a sectional view of a schematic representation of a valve block having a thermostatic control valve and several switching valves.
Figure 1:
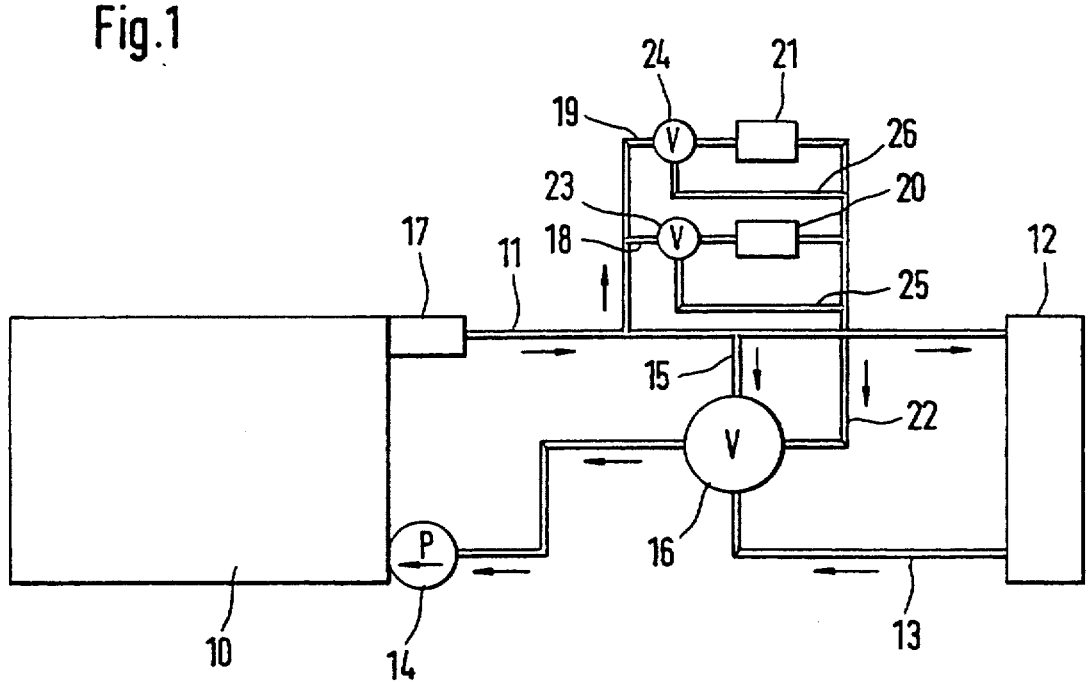

In FIG. 6, it is illustrated largely schematically that the switching valves 23, 24, 24' are combined together with a thermostatic control valve 16 to form a valve block. The thermostatic control valve 16 and the switching valves 23, 24, 24'; are arranged in a common housing 66 which is divided into two chambers 68, 69 by means of a wall 67. The chamber 68 is provided with an inlet junction piece 70 and the chamber 69 is provided with an outlet junction piece 71. The supplied coolant flows to the thermostatic control valve 16 and to the inlet junctions 33 of the switching valves 23, 24, 24'. One of the outlet junctions 32 or 31 is in each case connected to the chamber 69, while the other outlet junction is guided as an individual single junction out of the common housing 66. The plug connections 50 of the individual switching valves 23, 24, 24' also project out of the common housing 66.

Concerning FIG. 6, it should be noted that here the thermostatic control valve 16 is arranged in a so-called engine outlet control system so that the return flow junction piece 71 represents a bypass which leads to the engine inlet pipe. Naturally, it is also possible to arrange such a valve block such that the thermostatic control valve 16 carries out a so-called engine inlet control, in which case correspondingly different flow directions must be provided.

Instead of being provided with the illustrated thermostatic control valve 16, the valve block can also be equipped with a so-called characteristic diagram thermostat, as known, for example, from U.S. Pat. No. 5,385,296.

Although the invention has been described and illustrated in detail, it is to be clearly understood that the same is by way of illustration and example, and is not to be taken by way of limitation. The spirit and scope of the present invention are to be limited only by the terms of the appended claims.

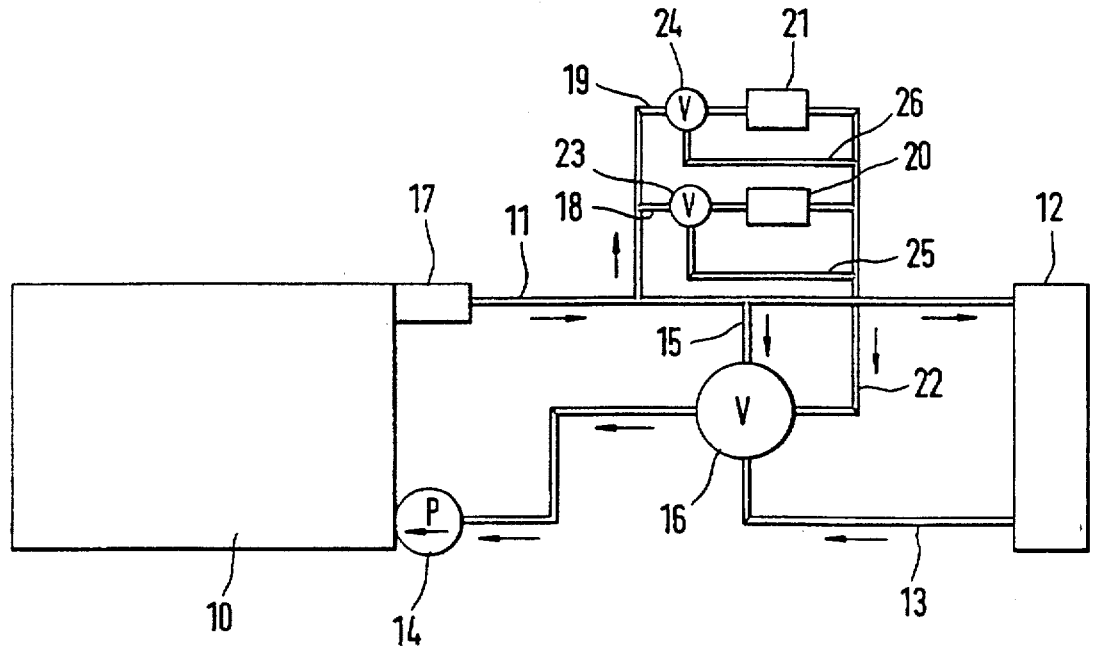

What is claimed is:

1. A cooling system for an internal-combustion engine which is cooled by a liquid coolant and which is arranged in a circulating system having a coolant radiator, to which circulating system at least one heat exchanger of an accessory device is connected by way of a switching valve which contains a valve element which can be switched into two positions and which, in one of said positions, blocks a connection between the coolant circulating system and the heat exchanger of the accessory device and, in the other of said position, opens up said connection, wherein a thermostatic working element is provided for switching the valve element, said thermostatic working element being biased by a restoring spring, being acted upon by the coolant and being provided with an electric heater, and wherein the thermostatic working element contains an expansion material which is designed for a switching temperature which is higher than a maximal operating temperature of the coolant flowing to the thermostatic working element.

2. A cooling system according to claim 1, wherein, in one of said positions, the switching valve opens up a connection to the heat exchanger of the accessory device and blocks a connection to a bypass bypassing the heat exchanger of the accessory device and, in the other of said positions, blocks the connection to the heat exchanger and opens up the connection to the bypass.

3. A cooling system according to claim 1, wherein the thermostatic working element is surrounded by a shield which is open when the heater is switched on and is closed when the heater is switched off.

4. A cooling system according to claim 2, wherein the thermostatic working element is surrounded by a shield which is open when the heater is switched on and is closed when the heater is switched off.

5. A cooling system according to claim 3, wherein the thermostatic working element has a housing which contains the expansion material and the electric heater and acts as a heat sensing part, the housing being held stationarily by a holder, a working piston being movable along with the valve element out from said housing, and wherein the valve element surrounds the working element in a pot-type manner and, together with the holder forms the shield.

6. A cooling system according to claim 4, wherein the thermostatic working element has a housing which contains the expansion material and the electric heater and acts as a heat sensing part, the housing being held stationarily by a holder, a working piston being movable along with the valve element out from said housing, and wherein the valve element surrounds the working element in a pot-type manner and, together with the holder forms the shield.

7. A cooling system according to claim 3, wherein the holder surrounds the housing of the thermostatic working element and is surrounded in a pot-type manner by the valve element.

8. A cooling system according to claim 4, wherein the holder surrounds the housing of the thermostatic working element and is surrounded in a pot-type manner by the valve element.

9. A cooling system according to claim 5, wherein the holder surrounds the housing of the thermostatic working element and is surrounded by the pot-type valve element.

10. A cooling system according to claim 6, wherein the holder surrounds the housing of the thermostatic working element and is surrounded by the pot-type valve element.

11. A cooling system according to claim 7, wherein the holder is provided with axial recesses in an area reaching around the housing of the thermostatic element.

12. A cooling system according to claim 8, wherein the holder is provided with axial recesses in an area reaching around the housing of the thermostatic element.

13. A cooling system according to claim 1, wherein a valve housing is provided which has an inflow junction between two mutually opposite outlet junctions, and wherein the valve element is provided with two closing elements, which are respectively assigned to corresponding valve seats of the outlet junctions.

14. A cooling system according to claim 13, wherein the pot-type valve element has an open edge which is provided with a collar serving as one of said closing elements.

15. A cooling system according to claim 13, wherein one of said closing elements is formed by a closed end of the valve element which is designed as a valve slide for the corresponding outlet junction.

16. A cooling system according to claim 15, wherein several axial webs project away from the closed end of the valve element, said axial webs centering the valve element in the pertaining valve seat.

17. A cooling system according to claim 1, wherein a thermostatic shut-off valve, which is designed for a given closing temperature, is arranged between the switching valve and the heat exchanger of the accessory device.

18. A cooling system according to claim 17, wherein the thermostatic shut-off valve is arranged with the switching valve in a common valve housing.

19. A cooling system according to claim 1, wherein several switching valves are combined to form a valve block which has a common inflow junction connected with the coolant circulating system, a common return flow junction leading back to the cooling circulating system, and individual junctions leading to the heat exchangers of the accessory devices.

20. A cooling system according to claim 19, wherein a thermostatic control valve of the coolant circulating system is housed in the valve block.

* * * * *

UNITED STATES PATENT AND TRADEMARK OFFICE
CERTIFICATE OF CORRECTION

PATENT NO. : 5,711,258
DATED : Jan. 27, 1998
INVENTOR(S) : Saur

It is certified that error appears in the above-identified patent and that said Letters Patent is hereby corrected as shown below:

The title page should be deleted to appear as per attached title page.

Please delete drawing sheets 1-4 and substitute drawing sheets 1-5 as per attached.

Signed and Sealed this

Twenty-fourth Day of August, 1999

Attest:

Q. TODD DICKINSON

*Attesting Officer*  *Acting Commissioner of Patents and Trademarks*

United States Patent
Saur

Patent Number: 5,711,258
Date of Patent: Jan. 27, 1998

[54] COOLING SYSTEM FOR AN INTERNAL-COMBUSTION ENGINE

[75] Inventor: Roland Saur, Stuttgart, Germany

[73] Assignee: Behr Thermot-tronik GmbH & Co., Kornwestheim, Germany

[21] Appl. No.: 799,805

[22] Filed: Feb. 13, 1997

[30] Foreign Application Priority Data

Feb. 21, 1996 [DE] Germany .................. 196 06 202.0

[51] Int. Cl.$^6$ ........................................ F01P 3/00
[52] U.S. Cl. ........................ 123/41.29; 123/41.33; 236/101 C; 236/34.5; 237/12.3 B
[58] Field of Search ............... 123/41.1, 41.29, 123/41.31, 41.33; 236/101 C, 34 S; 237/12.3 B

[56] References Cited

U.S. PATENT DOCUMENTS

| | | |
|---|---|---|
| 4,055,298 | 10/1977 | Wilson . |
| 4,190,198 | 2/1980 | Casuga et al. ............... 236/34.5 |
| 4,410,133 | 10/1983 | Furukubo . |
| 5,188,287 | 2/1993 | Chamot ............................ 236/34.5 |
| 5,271,559 | 12/1993 | Naujock ....................... 237/12.3 B |
| 5,381,951 | 1/1995 | Michel .............................. 236/34.5 |
| 5,385,296 | 1/1995 | Kurz et al. . |

FOREIGN PATENT DOCUMENTS

| | | |
|---|---|---|
| 0 467 130 | 1/1992 | European Pat. Off. . |
| 36 13 496 | 10/1987 | Germany . |
| 40 33 261 | 4/1992 | Germany . |
| 42 30 571 | 3/1994 | Germany . |
| 2155153 | 2/1985 | United Kingdom . |
| 2286675 | 2/1985 | United Kingdom . |

Primary Examiner—Erick R. Solis
Attorney, Agent, or Firm—Evenson, McKeown, Edwards & Lenahan, P.L.L.C.

[57] ABSTRACT

A cooling system for an internal-combustion engine which is cooled by means of a liquid coolant and is arranged in a circulating system having a coolant radiator, to which circulating system at least one heat exchanger of an accessory device is connected by means of a switching valve. As a switching element for switching the valve element, a thermostatic working element is used which is loaded by means of a restoring spring, is acted upon by the coolant and is provided with an electric heater. The thermostatic working element contains an expansion material which is designed to a switching temperature which is higher than a maximal operating temperature of the coolant flowing to the thermostatic working element.

20 Claims, 6 Drawing Sheets